United States Patent [19]

Guilbault et al.

[11] Patent Number: 4,866,872
[45] Date of Patent: Sep. 19, 1989

[54] APPARATUS AND METHOD FOR RETRIEVING FISH CAUGHT WHILE ICE FISHING

[75] Inventors: Roger E. Guilbault; Chuck Gilbert, both of Colorado Springs, Colo.

[73] Assignees: Timothy J. Martin; Russell C. Cline, both of Lakewood, Colo.

[21] Appl. No.: 273,961

[22] Filed: Nov. 18, 1988

[51] Int. Cl.$^4$ .............................................. A01K 69/00
[52] U.S. Cl. .......................................... 43/4; 43/4.5; 43/5; 43/15
[58] Field of Search .................. 43/4, 4.5, 5, 8, 15, 43/16, 17

[56]  References Cited

U.S. PATENT DOCUMENTS 3,722,940  3/1973  Misjak ........................................ 43/4
3,747,253  7/1973  Gangi et al. ................................ 43/4

Primary Examiner—Nicholas P. Godici
Assistant Examiner—Michael William Starkweather
Attorney, Agent, or Firm—Timothy J. Martin; J. Preston Oxenham

[57]  ABSTRACT

An ice fishing apparatus and method for retrieving fish through an ice hole during ice fishing provides a support member that is mounted to a base member that is supported by the upper surface of an ice layer. The support member is extended and retracted through the ice hole and is operative to support a fish during such motion. An extension and retrieval mechanism, such as a slide rod interconnecting the base and support member, operates to extend and retract the support member whereby a fish caught on a fishing line may be maneuvered to the ice hole, and onto the support member and supported during upward movement through the ice hole. The support member may be pivoted out of alignment with the ice hole so as not to obstruct the lower opening thereto, and biased against the ice layer lower surface in a ready position. An adjustable limit stop accommodates ice layers of varied thicknesses. The base member is preferably a circular collar, and the support member a pan element with drain holes.

29 Claims, 3 Drawing Sheets

APPARATUS AND METHOD FOR RETRIEVING FISH CAUGHT WHILE ICE FISHING

FIELD OF THE INVENTION

The present invention relates generally to the field of fishing and the assisted retrieval of fish caught on a fishing line by an angler. More specifically, the present invention is directed to the field of ice fishing wherein an ice fisher casts a line through a hole cut in a layer of ice over a body of water. The present invention is, accordingly, specifically directed to an apparatus and method to assist in retrieving fish through the ice hole.

BACKGROUND OF THE INVENTION

While originally mankind's skill fishing grew out of recognition that fresh water and salt water fish were abundant as a food source, many modern men and women enjoy fishing simply as sport and as a way to pass leisure hours. These men and women, who may be collectively referred to as anglers, practice many different types of fishing, examples of which include bait fishing, fly fishing, spin cast fishing, and ice fishing, to name a few. In each of these sports, a fishing line is used which line is wound on a dispensing assembly such as a reel, which in turn is mounted on a fishing pole. A hook apparatus is located on a free end of the fishing line and is provided with either a real or artificial food stuff to attract a fish. When a fish is caught by the hook element, the fish is retrieved to the angler by means of the fishing line.

Part of the skill of fishing is maintaining a proper tension on the fishing line so that it does not exceed breaking strength of the fishing line so that the fish does not escape. Since the weight of the fish freely suspended by a fish line may often exceed the breaking strength of the line, anglers often employ retrieving apparatus, such as hand held nets, to help retrieve the fish once it has been maneuvered to a location proximate the angler. However, in the sport of ice fishing, the use of traditional retrieval apparatus has been impossible, and applicants know of no apparatus or method which is heretofore been widely accepted by anglers who ice fish.

The reason for the lack of a commonly used apparatus and method for retrieving fish while ice fishing resides in the nature of ice fishing, itself. As is well known, when an angler engages in the sport of ice fishing, the angler establishes a fishing location on the upper surface of a thick ice layer formed over a body of water that defines the fish habitat, and the angler carves an ice hole through the layer of ice to expose the water. While such an ice hole may be formed in any manner, typically, the angler employs a boring tool which carves a cylindrical hole through the ice layer so that the whole has an upper and lower opening and a cylindrical sidewall. The typical boring tool is 8" in diameter. After carving such hole, the angler places the bait or artificial lure on the hook element and suspends the hook element in the water so as to attract a fish. Once a fish is caught, the angler maneuvers the fish to lower opening of the ice hole and then pulls the fish upwardly through the ice hole to complete the catch.

As noted above, a problem can arise where the weight of a fish exceeds the breaking strength of the fishing line or where additional stress is created by the frenzied movement of the fish as it is being withdrawn through the ice hole. In either of these situations, there is a tendency for a fishing line to break under such stress which allows the fish to escape. Further, there is an increased possibility for a fish to slip off or detach itself from the hook during an attempt to land the fish through the ice hole. Due to the size of the ice hole, it is impossible to utilize the traditional hand held fish net to assist in the retrieval of the fish through the ice hole since the head of the net will not fit therethrough.

SUMMARY OF THE INVENTION

It is an object of the present invention to provide a new and useful apparatus and method to assist in the retrieval of fish caught through an ice hole during the sport of ice fishing.

It is another object of the present invention to provide an apparatus and method that positively supports a fish during upward movement through an ice hole formed in the layer of ice on the surface of a body of water when ice fishing.

Yet another object of the present invention is to provide an apparatus which may be positioned adjacent an ice hole during ice fishing and which may be used to retrieve a fish through the ice hole without interfering with the ice fishing operation.

It is a still further object of the present invention to provide an apparatus for use in retrieving fish during ice fishing which is adjustable so as to accommodate the different ice layer thicknesses.

According to the present invention, then, an apparatus is provided for use by an angler during ice fishing to retrieve a fish caught on a fishing line wherein the angler fishes through an ice hole cut through an ice layer formed on a body of water that defines the fish's habitat. This apparatus broadly includes a base member that is adapted to be placed on and supported by an upper surface of the ice layer at a location adjacent the ice hole. A support member, operative to support a fish caught on the fishing line, is mounted to said base member and is movable between an extended position spaced from the base member at a lower surface of the ice layer and into a retracted position proximate the base member so that this support member may positively support a fish positioned thereon as the support member is moved from the extended to the retracted position. An extension and retrieval mechanism is provided; this mechanism interconnects the base member and the support member and is operative to move the support member between the extended and retracted positions whereby the support member may be initially moved into the extended position proximate a lower surface of the ice layer so that a fish caught on the fish line may be maneuvered by the angler onto the support member when it is in the extended position. The extension and retrieval mechanism may then be employed to move the support member toward the retracted position upwardly through the ice hole thereby retrieving the fish from the body of water.

In its more detailed structure, the preferred embodiment of the retrieval apparatus according to the present invention employs a pan element as the support member and the extension and retrieval mechanism is in the form of an elongated rod that is slideably mounted to the base member so that a central portion of the elongated rod may slide upwardly and downwardly through the base member. The pan element is then positioned at a lower end of the elongated rod, at an upper end of the rod is bent at a right angle to form a handle to facilitate grasping by the angler, and this handle may be provided with a protective grip. It is further preferred that the rod member be rotatably mounted to the base member and that the lower end of the rod member be connected to the pan element at a peripheral margin of the pan element so that the pan element may be rotated from the extended position into a ready position out of alignment with the ice hole so that the pan element does not obstruct the ice hole. A limit stop element is adjustably secured to the central portion of the elongated rod so that the angler may set the maximum distance of spacing between the base member and the pan element in the extended position. A biasing spring may be mounted on the central portion of the rod between the limit stop element and the base member so that the pan element may be forced into the extended position, rotated into the ready position and then released; the biasing spring then biases the pan element upwardly against the lower surface of the ice layer to retain it in the ready position.

Preferably, the base member is in the form of a circular collar having an annular portion which abuts the upper surface of the ice layer. A downwardly depending skirt may extend into the ice hole to help hold the base member in position. This skirt is formed at a diameter slightly smaller than the typical diameter of an ice hole, and the pan element is circular having a diameter slightly smaller than the diameter of the skirt. Further, the pan element may be provided with a plurality of drain holes to allow water to flow therethrough. The annular portion of the base element may have a circular channel formed there around with this channel operative to retain fluid water when the base member is positioned on the ice layer so that this water will then freeze in a circular ridge to help secure the base member on the ice layer.

The broad method according to the present invention is directed to retrieving a fish caught on a fishing line and hook by an angler while ice fishing through an ice hole cut through an ice layer on a body of water. This broad method includes a first step of extending a support member downwardly through the ice hold so that the support member is in an extended position located proximate the lower opening. Next, the support member is moved away from the lower opening and out of axial alignment with the ice hole into a ready position so that the support member does not obstruct the hole or opening. The support member is releasably secured in this ready position. Next, the method includes the step of maneuvering a fish caught on the fishing line to the lower opening and then moving the support member back to the extended position in axial alignment with the ice hole underneath the fish and adjacent the lower opening. The method then includes the step of retracting the support member upwardly through the ice hole so that the fish is supported by the support member and moved upwardly until the support member is in a retracted position proximate the upper opening. Thereafter, the fish is removed from the hook. In the preferred method, the step of moving the support member away from and back to the lower opening between the extended position and the ready position is accomplished by pivoting the support member in a plane transverse to the longitudinal access to the ice hole. Also, in the preferred method, the securing of the support member in the ready position is accomplished by resiliently biasing the support member upwardly against the lower surface of the ice layer.

The broad apparatus and method according to the present invention will become more readily appreciated and understod from a consideration of the following detailed description of the preferred embodiment when taken together with the accompanying drawings, in which:

DETAILED DESCRIPTION OF THE PREFERRED EMBODIMENT

The present invention relates to ice fishing and is specifically directed to an apparatus and method for retrieving fish caught on a fishing line and hook by an angler when ice fishing through an ice hole cut in a layer of ice on a body of water. This apparatus and method provide a new and useful way to assist in the retrieval of fish through an ice hole in order to minimize risks in loosing a fish resulting from breakage of the fishing line when the fish is retrieved after being maneuvered to the ice hole.

Figure 1:
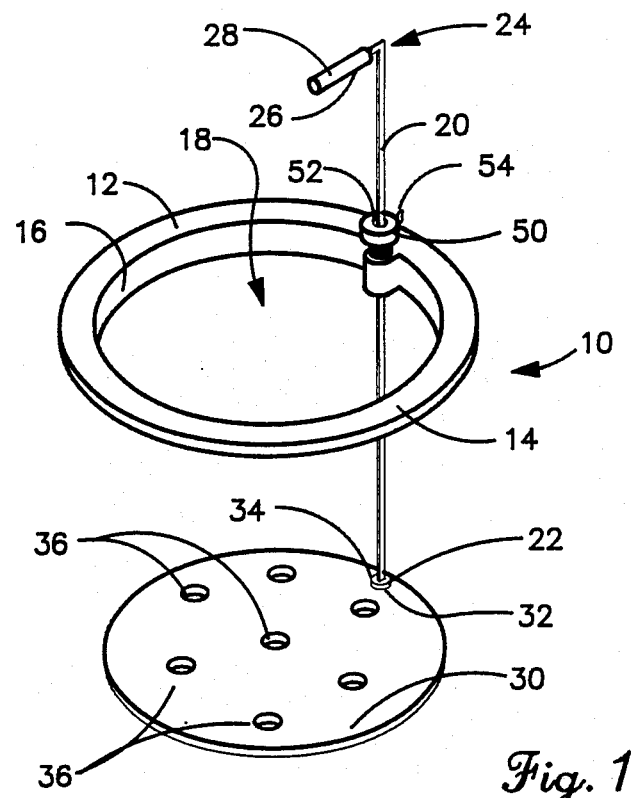
FIG. 1 is a perspective view of the apparatus for retrieving fish according to the preferred embodiment of the present invention.

The fish retrieval apparatus according to the present invention is shown in perspective in FIG. 1. Here, fish retrieving apparatus 10 includes a base member 12 in the form of a circular collar having a flat annular portion 14 and a downwardly depending skirt 16 which together form a central circular opening 18. An elongated rod 20 is slideably mounted in base member 12 generally parallel to the primary axis of opening 18. A support member 30, preferably in the form of a stiff, disc-shaped pan, is mounted at a first end 22 of rod 20. A second end 24 of rod 20 is bent at a right angle into an arm that forms a handle portion 26 opposite first end 22. Handle portion 26 is provided with a protective grip 28.

Support member 30 is mounted in any convenient manner to first end 22 of rod 20 such as by means of a pin or bolt 32 which extends through post 34 and the first end 22 of rod 20 received therein. Support member 30 is provided with a plurality of holes 36 which form water drain ports therethrough. Support member 30 is oriented generally parallel to base member 12, with each of base member 12 and support member 30 being located in planes generally transverse to the primary axis of opening 18.

An adjustable limit stop member 50 is constructed as a disc-shaped element having a bore 52 therethrough which slideably receives the central portion of rod 20. A thumb screw 54 extends through a threaded radial bore 56 so that thumb screw 54 may be tightened to releasably secure limit stop member 50 at a selected position along rod 20. A spring 60 is slideably received on rod 20 between base member 12 and limit stop member 50.

Figure 2:
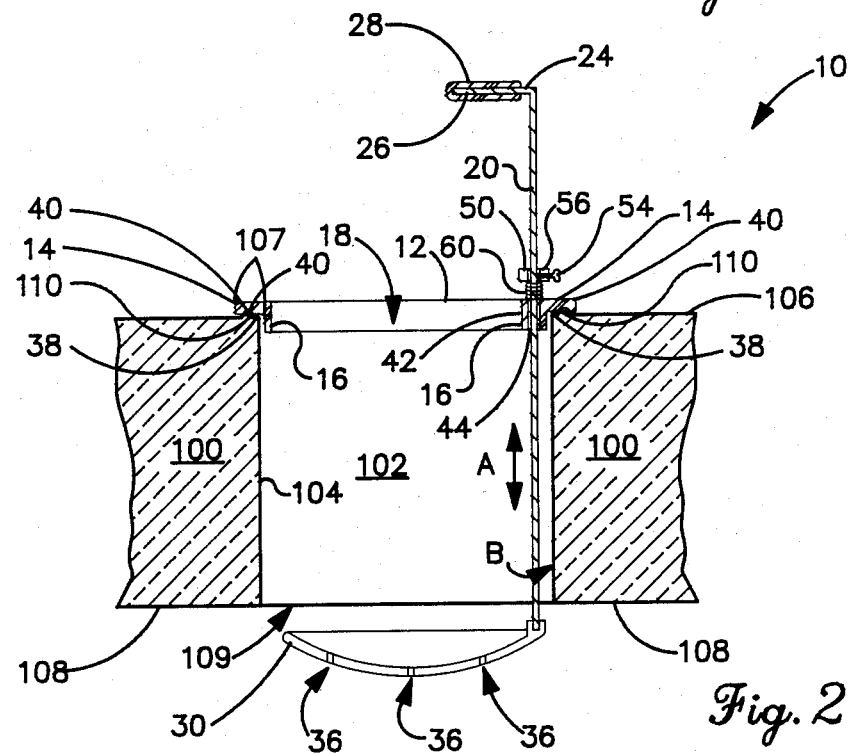
FIG. 2 is a side view and cross section showing the apparatus of FIG. 1 in a mounted position in an ice hole.

The construction and operation of fish retrieval apparatus 10 is shown in further detail in FIG. 2. Here, fish retrieval apparatus 10 is shown in cross section mounted in a standard, cylindrical ice hole 102 cut in an ice layer 100 which typically freezes over a body of water that defines habitat for fish during cold weather. Cylindrical ice hole 102 has a surrounding side wall 104 and is commonly approximately 8 inches diameter, that being the diameter of a standard ice auger used in ice fishing. Ice layer 100 has an upper surface 106 and a lower surface 108 which faces the water habitat of the fish. Correspondingly, ice hole 102 has an upper opening 107 through upper surface 106 and a lower opening 109 through lower surface 108.

As is shown in FIG. 2, base member 12 is adapted to be inserted into the upper opening and upper surface 106 so that skirt 16 extends downwardly alongside an upper portion of side wall 104 and opening 18 corresponds to opening 107. Flat annular portion 14 then abuts the edge portion of upper surface 106 adjacent the upper opening so that opening 18 is axially aligned with the longitudinal access of ice hole 102. As may be seen in FIG. 2, a bottom surface 38 of annular portion 14 has a circular channel 40 formed therein. Circular channel 40 serves to trap fluid water during installation of fish retrieval apparatus 10 which may then freeze into an ice rib 110 that helps lock base member 12 into position in ice hole 102.

Base member 12 includes a knuckle 42 that is provided with a slide passageway 44 through which rod 20 extends and which may be slid in the direction of arrow A and rotated in the direction of arrow B as is shown in FIG. 2. Limit stop member 50 may be slid and locked into position so that the distance between limit stop 50 and support member 30 is slightly greater than the thickness of ice layer 100. Thus, the aparatus 10 is adjustable for different ice layer thicknesses. As may be seen in FIG. 2, rod 20 extends longitudinally through ice hole 102 parallel to the access thereof but adjacent side wall 104. Rod 20 may be rotated so that support member 30 pivots away from the lower opening 109 in lower layer 108 so that it is out axial alignment with hole 102. In FIG. 2, spring 60 is compressed.

Figure 3A:
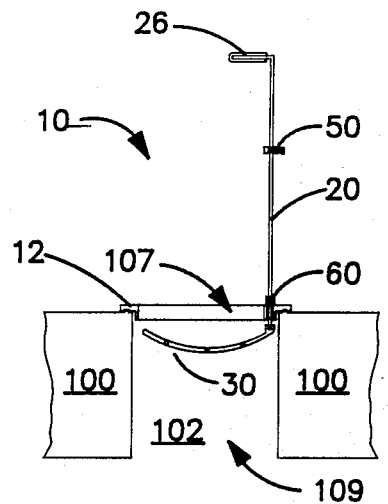
FIGS. 3a–3f are side views in cross section showing operation of the preferred apparatus according to the preferred method of the present invention.
Figure 3B:
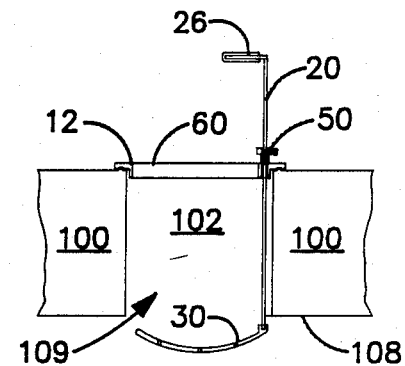
Figure 3C:
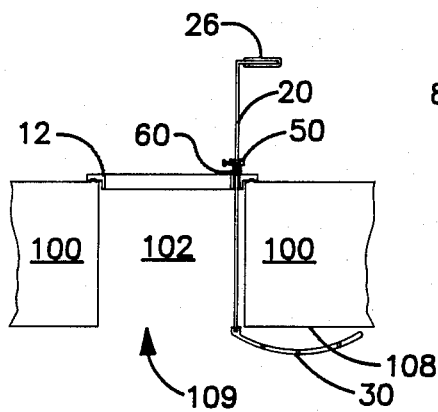
Figure 3D:
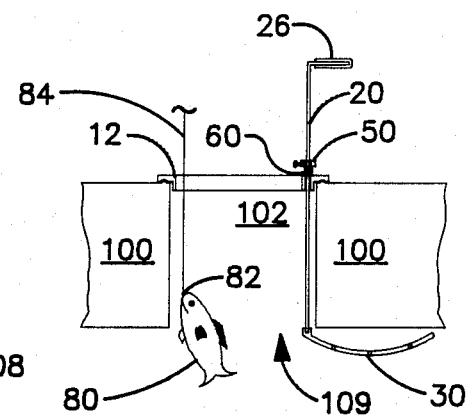
Figure 3E:
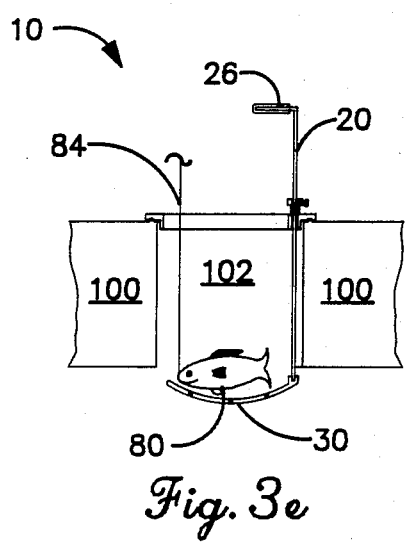
Figure 3F:
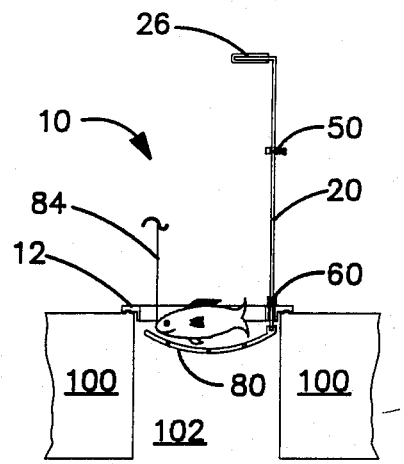

The operation of fish retrieval apparatus 10 may now be best understood with respect to FIGS. 3a–3f. In FIG. 3a, fish retrieval apparatus 10 is shown in a retracted position with spring 60 in an uncompressed state and limit stop 50 in a set position corresponding to the thickness of ice layer 100. As may be seen, support member 30 is proximate base member 12 and is corresponding proximate upper opening 107 in ice layer 100. Support member 30 may then be moved to an extended position, as is shown in FIG. 3b. Here, support member 30 is axially aligned with ice hole 102 and is proximate lower opening 109 in ice layer 100. As may be noted in FIG. 3b, limit stop member 50 compresses spring 60 so that support member 30 may clear lower surface 108 of ice layer 100. Ice fishing apparatus 10 may be then moved to a ready position by rotating rod 20 into the position shown in FIG. 3c. This pivots support member 30 in a plane transverse to the longitudinal axis of the ice hole 102 so that support member 30 is out of axial alignment with ice hole 102 thus leaving opening 109 substantially unobstructed. Spring 60 exerts a biasing force against limit stop member 50 to move support member 30 into abutment with lower surface 108 to hold support member 30 in the ready position.

An angler may then catch a fish 80 on a hook 82 secured to an end of fish line 84 and maneuver fish 80 into position at lower opening 109. The angler then manipulates handle 26 to rotate rod 20 thus pivoting support member 30 back into axial alignment with hole 102 thus supporting fish 80 at the lower opening and enclosing the lower opening 109 of ice hole 102 so that the fish may not escape. The angler then moves fish retrieval apparatus 10 from the extended position shown in FIG. 3e to the retracted position shown in FIG. 3f to elevate fish 80 upwardly through ice hole 102 so that the fish may be retrieved and removed from fishing line 84. Thus, it is the mechanical strength of fish retrieval apparatus 10 which bears the weight of the fish 80 and not fishing line 84.

In the preferred embodiment of the present invention, base member 12, support member 30 and limit stop member 50 are conveniently formed out of injection molded plastic pieces, but any suitable materials known in the art may be employed in this construction. Rod 20 is preferably a metal rod of either circular or square stock, and protective grip 28 may be any suitable plastic sleeving material. It should be appreciated, though, that other construction and construction materials may be employed without departing from the scope of this invention.

Figure 4:
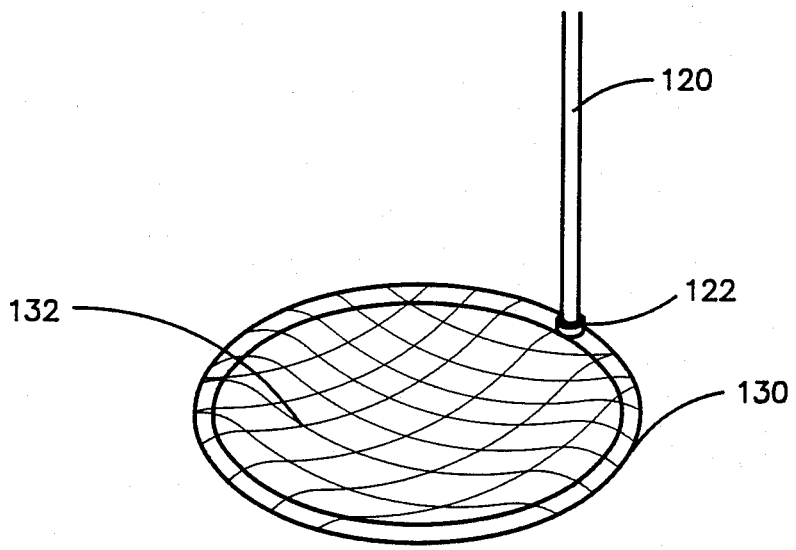
FIG. 4 is a perspective view of an alternate embodiment of the support member according to the present invention.

An example of an alternate embodiment of a support member to support a fish during retrieval is shown in FIG. 4. Here, support member 130 is located at a first end 122 of rod 120 and is in the form of an annular ring of material which mounts a net 132 along its circumference so that net 132 may support a fish during retrieval. Naturally, other alternate support means are within the scope of the present invention with the examples of support member 30 and 130 being provided for illustrative purposes.

From the foregoing, it should be appreciated that the present invention provides a method for retrieving a fish caught by an angler on a fishing line while ice fishing through an ice hole cut through an ice layer formed on a body of water that defines the habitat for the fish. In such method, the ice hole has an upper opening at the upper surface of the ice layer and a lower opening at a lower surface of the ice layer that faces the water. The preferred method includes a first step of extending a support member downwardly through the ice hole so that the support member is in an extended position located proximate the lower opening of the ice hole. The support member is then moved into a ready position away from the lower opening and out of axial alignment with the ice hole such that the support member does not obstruct the lower opening. The support member is releasably secured in this ready position. After catching a fish, the fish is maneuvered on the fishing line to the lower opening, and the angler then moves the support member back to the lower opening and into axial alignment with the ice hole underneath the fish. The angler may then retract the support member upwardly through the ice hole so that the fish is supported thereby and moved upwardly until the support member is in a retracted position proximate the upper opening. The angler then, of course, removes the fish from the hook and line. Preferably, the step of moving a support member away from and back to the lower opening is accomplished by pivoting the support member in a plane transverse to the longitudinal access of the ice hole. Further, the step of releasably securing the suport member in the ready position is preferably accomplished by resiliently biasing the support member upwardly against the lower surface of the ice layer.

Accordingly, the present invention has been described with some degree of particularity directed to the preferred embodiment of the present invention. It should be appreciated, though, that the present invention is defined by the following claims construed in light of the prior art so that modifications or changes may be made to the preferred embodiment of the present invention without departing from the inventive concepts contained herein.

We claim:

1. Apparatus for use by an angler during ice fishing to retrieve a fish caught on a fishing line through circular hole in an ice layer formed on a body of water that defines the fish's habitat, wherein the circular hole has a circumferential edge at an upper surface of the ice layer, comprising:

a base member adapted to be placed on and supported by an upper surface of the ice layer at a location adjacent to the ice hole;

a support member mounted to said base member and movable between an extended position spaced form said base member and a retracted position proximate said base member, said support member operative to support a fish positioned thereon during retrieval through the ice hole; extension and retrieval means for moving said support member between the extended position and the retracted position whereby said support member may be intially moved into the extended position proximate a lower surface of the ice layer so that a fish caught on the fishing line may be maneuvered onto said support member in the extended position and then supported by said support member as said support member is moved toward the retracted position upwardly through the ice hole thereby retrieving said fish from the body of water wherein said support member is pivotable into and out of alignment with the ice hole;

means for pivoting said support member in the extended position so that said support member may be moved downwardly through the ice hole and into the extended position and then pivoted into a ready position underneath the lower surface of said ice layer whereby the ice hole is unobstructed by said support member in the ready position; and bias means for biasing said support member upwardly toward the ready position whereby said support member is biased against the lower surface of the ice layer to retain said support member in the ready position.

2. Apparatus according to claim 1 including adjustable limit stop means for limiting a maximum distance of spacing between said support member and said base member in the extended position, said limit stop means being adjustable to vary said maximum distance of spacing.

3. Apparatus according to claim 1 wherein said extension and retrieval means includes an elongated rod slideably mounted to said base member, said support member mounted to a first end portion of said rod.

4. Apparatus according to claim 3 wherein a second end portion of said rod opposite said first end portion defines a handle member to facilitate manual gripping of said rod whereby said rod may be slideably moved with respect to said base member to move said support member between the extended and retracted positions.

5. Apparatus according to claim 4 including a protective grip on said handle member operative to facilitate the grasping thereof by an angler's hand.

6. Apparatus according to claim 1 wherein said support member is defined by a pan element oriented transversely to a longitudinal axis of the ice hole as said pan element moves therethrough.

7. Apparatus according to claim 1 wherein the hole formed in the ice layer is circular and has a circumferential edge at said upper surface, said base member being defined by a circular collar sized to extend around said circumferential edge.

8. Apparatus according to claim 7 wherein said collar has an annular portion surrounding the ice hole which annular portion has a bottom surface contacting the upper surface of the ice layer, and wherein said collar has a downwardly depending skirt extending into the ice hole.

9. Apparatus according to claim 8 wherein said annular portion has a channel formed in the bottom surface thereof, said channel operative to trap water which may then freeze and bond onto the ice layer thereby mechanically locking the base member in place around the ice hole.

10. Apparatus for use by an angler during ice fishing to retrieve a fish caught on a fishing line through a cylindrical hole cut vertically through an ice layer formed on a body of water defining the fish's habitat wherein said hole has an upper circular opening at an upper surface of the ice layer, a lower circular opening at a lower surface of the ice layer and a cylindrical side wall, the apparatus comprising:

a circular collar forming a base adapted to be placed on and supported by the upper surface of the ice layer, said collar having an annular portion contacting the upper surface of the ice layer and extending around said upper opening to be in axial alignment therewith:

means for securing said collar in place around the upper opening to prevent said collar from moving out of axial alignment with the ice hole;

an elongated rod slideably mounted to said collar and extending longitudinally of the ice hole adjacent a side wall thereof, said rod having a first end and a second end, said second end defining a handle portion adapted to be manually gripped by the angler whereby the angler may manipulate the rod;

a pan element rigidly mounted to the rod at the first end thereof, said pan element movable between an extended position spaced form said collar and a retracted position proximate said collar, said pan element operative to support a fish positioned thereon during retrieval through the ice hole whereby the fish caught on the fish line may be maneuvered to the lower opening and onto the pan element in the extended position after which the angler may manipulate the rod to move the pan element upwardly through the ice hole toward the retracted position thereby retrieving the fish from the body of water.

11. Apparatus according to claim 10 wherein said means for securing includes a skirt portion downwardly depending from said annular portion, said skirt extending into and engaging the ice hole.

12. Apparatus according to claim 11 wherein said annular portion has a bottom surface contacting the upper surface of the ice layer, said means for securing further including a circular channel formed in the bottom surface, said channel operative to trap water which may then freeze and bond onto the ice layer thereby mechanically locking the base member in place around the ice hole.

13. Apparatus according to claim 10 wherein an upper portion of the rod at the second end thereof is bent at a right angle to a central portion of the rod to form an arm defining said handle portion.

14. Apparatus according to claim 13 including a protective grip on said arm.

15. Apparatus according to claim 10 wherein said pan element has a plurality of drain holes therethrough.

16. Apparatus according to claim 10 wherein said pan element is located in a plane perpendicular to the rod.

17. Apparatus according to claim 10 wherein said rod is rotatably mounted to said collar whereby said pan element may be swung into and out of axial alignment with the ice hole whereby said pan element may be moved downwardly through the lower opening into the extended position and then pivoted into a ready position out of axial alignment with the ice hole underneath the ice layer so that the lower opening is relatively unobstructed by the pan element in the ready position.

18. Apparatus according to claim 17 including an adjustable limit stop element mounted on a central portion of the rod and operative to set a maximum spacing of said pan element from said collar to define said extended position, said limit stop element moving proximate the collar in the extended position.

19. Apparatus according to claim 18 including bias means for biasing said pan element upwardly toward the retracted position whereby said pan element is biased against the lower surface of the ice layer to retain said support member in the ready position.

20. Apparatus according to claim 19 wherein said bias means is defined by a spring slideably received on the central portion of the rod and located between said collar and said limit stop element.

21. A method for retrieving a fish caught on a fishing line and hook by an angler while ice fishing through an ice hole cut through an ice layer formed on a body of water that defines a habitat for the fish, said ice hole having an upper opening at an upper surface of the ice layer and a lower opening at a lower surface of the ice layer facing the water, the method comprising the steps of:
  extending a support member downwardly through the ice hole so that the support member is in an extended position located proximate the lower opening;
  moving said support member away from the lower opening and out of axial alignment with the ice hole and resiliently biasing the support member into a ready position upwardly against the lower surface of the ice layer so that the support member does not obstruct the lower opening and releasably securing said support member in the ready position;
  maneuvering the fish caught on the fishing line to the lower opening;
  moving said support member back to the lower opening and into axial alignment with said ice hole underneath the fish;
  retracting said support member upwardly through the ice hole so that the fish is supported thereby and moved upwardly until the support member is in a retracted position proximate said upper opening; and
  removing the fish from the hook.

22. The method according to claim 21 wherein said steps of moving said support member away from and back to the lower opening is accomplished by pivoting the support member in a plane transverse to the longitudinal axis of the ice hole.

23. Apparatus for use by the angler during ice fishing to retrieve a fish caught on a fishing line through a circular hole in an ice layer formed on a body of water that defines the fish's habitat, wherein the circular hole has a circumferential edge at an upper surface of the ice layer, comprising:
  a base member, said base member being defined by a circular collar sized to extend around said circumferential edge adapted to be placed on and supported by an upper surface of the ice layer at a location adjacent the ice hole;
  a support member mounted to said base member and movable between an extended position spaced form said base member and a retracted position proximate said base member, said support member operative to support a fish positioned thereon during retrieval through the ice hole;
  extension and retrieval means for moving said support member between the extended position and the retracted position whereby said support member may be initially moved into the extended position proximate a lower surface of the ice layer so that a fish caught on the fishing line may be maneuvered onto said support member in the extended position and then supported by said support member as said support member is moved toward the retracted position upwardly through the ice hole thereby retrieving said fish from the body of water.

24. Apparatus according to claim 23 wherein said support member is pivotable into and out of alignment with the ice hole, and including means for pivoting said support member in the extended position so that said support member my be moved downwardly through the ice hole and into the extended position and then pivoted into a ready position underneath the lower surface of said ice layer whereby the ice hole is unobstructed by said support member in the ready position.

25. Apparatus according to claim 23 including adjustable limit stop means for limiting a maximum distance of spacing between said support member and said base member in the extended position, said limit stop means being adjustable to vary said maximum distance of spacing.

26. Apparatus according to claim 23 wherein said extension and retrieval means includes an elongated rod slidably mounted to said base member, said support member mounted to a first end position of said rod.

27. Apparatus according to claim 23 wherein said support member is defined by a pan element oriented transversely to a longitudinal axis of the ice hole as said pan element moves therethrough.

28. Apparatus according to claim 23 wherein said collar has an annular portion surrounding the ice hole which annular portion has a bottom surface contacting the upper surface of the ice layer, and wherein said collar has a downwardly depending skirt extending into the ice hole.

29. Apparatus according to claim 28 wherein said annular portion has a channel formed in the bottom surface thereof, said channel operative to trap water which may then freeze and bond into the ice layer thereby mechanically locked the base member in place around the ice hole.

* * * * *